United States Patent
Mayer et al.

(10) Patent No.: US 6,372,875 B1
(45) Date of Patent: Apr. 16, 2002

(54) PROCESS FOR THE PREPARATION OF POLYURETHANE RESINS AND THEIR USE AND THE USE OF ETHOXYETHYL PROPIONATE FOR THE PREPARATION OF POLYURETHANE RESINS

(75) Inventors: Bernd Mayer, Münster; Michael Grabbe, Senden; Heinz Peter Rink, Münster; Uwe Meisenburg, Duisburg, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 08/564,304

(22) PCT Filed: Jun. 16, 1994

(86) PCT No.: PCT/EP94/01956

§ 371 Date: Jan. 22, 1996

§ 102(e) Date: Jan. 22, 1996

(87) PCT Pub. No.: WO95/00570

PCT Pub. Date: Jan. 5, 1995

(30) Foreign Application Priority Data

Jun. 24, 1993 (DE) .......................................... 43 20 969

(51) Int. Cl.[7] .............................................. C08G 18/10
(52) U.S. Cl. ........................... 528/60; 528/48; 524/773; 524/875; 524/591; 524/71; 428/425.8
(58) Field of Search ................................ 524/773, 875, 524/591, 71; 528/60, 48; 428/425.8

(56) References Cited

U.S. PATENT DOCUMENTS 4,981,921 A * 1/1991 Blum et al. ................... 525/419
5,360,642 A * 11/1994 Chandalia et al. ............. 528/75
5,370,910 A * 12/1994 Hille et al. ................... 524/589

FOREIGN PATENT DOCUMENTS

DE 40 13 546 A1 4/1990 ............ C08L/75/04
EP 0 261 775 A1 7/1987 ............. B22C/1/22

* cited by examiner

Primary Examiner—Rachel Gorr

(57) ABSTRACT

The present invention relates to a process for the preparation of polyurethane resins, in which, in an ester as solvent,
a) at least one compound having 2 hydroxyl and/or amino groups,
b) at least one di- and/or polyisocyanate,
c) at least one compound containing 2 groups which are reactive toward isocyanate groups, these compounds containing, at least in part, at least one group capable of forming anions which is neutralized before or after incorporation of component (c) into the polyurethane molecule, and
d) at least one compound having at least 3 hydroxyl and/or amino groups
are used to prepare a polyurethane resin, preferably using components (a), (b) and (c) to prepare an intermediate which has terminal isocyanate groups and at least some of whose free isocyanate groups are subsequently reacted with component (d), characterized in that ethoxyethyl propionate is employed as solvent.

16 Claims, No Drawings

PROCESS FOR THE PREPARATION OF POLYURETHANE RESINS AND THEIR USE AND THE USE OF ETHOXYETHYL PROPIONATE FOR THE PREPARATION OF POLYURETHANE RESINS

The present invention relates to a process for the preparation of polyurethane resins, in which, in an ester as solvent, a) at least one compound having 2 hydroxyl and/or amino groups,
b) at least one di- and/or polyisocyanate,
c) at least one compound containing 2 groups which are reactive toward isocyanate groups, these compounds containing, at least in part, at least one group capable of forming anions which is neutralized before or after incorporation of component (1 c) into the polyurethane molecule, and
d) at least one compound having at least 3 hydroxyl and/or amino groups are used to prepare a polyurethane resin, preferably using components (a), (b) and (c) to prepare an intermediate which has terminal isocyanate groups and at least some of whose free isocyanate groups are subsequently reacted with component (d).

The present invention also relates to the use of the polyurethane resins and to the use of ethoxyethyl propionate as solvent for the preparation of polyurethane resins.

The present invention consequently also relates to coating compositions containing these polyurethane resins, processes for the production of these coating compositions and processes for coating substrates using these coating compositions.

Aqueous polyurethane dispersions and processes for their preparation are known to those skilled in the art. Of particular technical importance is the so-called acetone process. In this process, generally, a prepolymer having NCO end groups is first prepared, which is subsequently dissolved in an inert solvent followed if appropriate by chain lengthening in solution to give a polyurethane of higher molecular weight. The additions made in the so-called acetone process of low-boiling solvents such as, for example, acetone are necessary inter alia in order to reduce the viscosity of the prepolymer and thus to render it capable of being handled, subsequent dispersion only then being possible.

The disadvantage of such preparation processes, taking into account the usually applicable requirement for solvent-free products, is that a technically complex distillation step has to follow the dispersion procedure in order to remove—at least predominantly—the low-boiling component such as acetone. Ketones, for example acetone, are in fact a cause of poor coatings properties in an aqueous system. In addition, ketones such as acetone are toxic to fish and are notable for relatively low flash points (acetone −18° C., methyl ethyl ketone −4.4° C. and methyl isobutyl ketone +15.5° C.). In the USA methyl ethyl ketone and methyl isobutyl ketone are on the list of hazardous air-polluting substances, so that even residual quantities in the coating should be avoided.

Replacing ketones by other solvents is carried out in a stripping procedure. This procedure involves removing the ketone as a mixture with the second solvent in vacuo. This implies an additional process step which not only complicates the process but also leads to an increase in the cost of the product. The latter not least because the acetone preferably employed cannot be recycled directly to the process, since anhydrous acetone is preferably employed. The question for the person skilled in the art is thus whether and, if so, to what extent a residual solvent content is acceptable, since it is on this that the complexity of the process depends. To fulfill the requirement for an entirely solvent-free product prepared by this process necessitates a comparatively high expenditure.

The desire is therefore for solvent substitutes which can be employed, instead of the solvents hitherto known and used, in the preparation of aqueous polyurethane dispersions. In this context the solvents used as an alternative to ketones must meet a number of requirements:

ignition temperatures >200° C.
inert toward isocyanates (including any impurities)
widely available industrially
adequate miscibility with water (may possibly be improved by cosolvents)
flash point >55° C.
suitable for coatings (ability to be evaporated)
favorable price
appropriate boiling point.

In addition to ketones, it is in principle also possible to employ ethers and esters for the synthesis of polyurethane resins. Thus DE-A-40 13 546 discloses the employment of propanediols and/or triols esterified with acetic acid as solvents for the preparation of polyurethane dispersions by processes which are known per se.

The use of these solvents described in DE-A-40 13 546, however, has the disadvantage that esters of acetic acid, such as methoxypropyl acetate, ethoxypropyl acetate and butoxypropyl acetate, are in general susceptible to hydrolysis. In addition they are not suitable for the preparation of polyurethanes at elevated temperatures of from 100 to 130° C. since even at these temperatures they undergo considerable decomposition in the reaction mixture. However, because of ever stricter environmental regulations the requirement is for polyurethane resin solutions with as high a solids content as possible but the preparation of such solutions necessitates the use of elevated temperatures in order to overcome the viscosity problems. In addition, higher temperatures are desirable because of the reduction in reaction time which is associated with them.

Also unsuitable in practice is, for example, methoxypropyl acetate, since at 50 ppm it has too low an MAC value (maximum workplace concentration). Furthermore, methoxypropyl acetate is classified in pregnancy group C. Ethoxypropyl acetate has the disadvantage that the resulting polyurethane solutions are of very high viscosity. Butoxypropyl acetate, finally, has to be ruled out because of its poor solubility in water. DE-A 41 10 520 discloses the preparation of polyurethane resins in solvents which remain in the coating material and do not have to be exchanged. Examples of suitable solvents which are specified are methoxypropyl acetate, ethoxyethyl acetate (common name for ethylene glycol monoethyl ether acetate) and N-methylpyrroline. The acetates specified, however, have the disadvantages already indicated. Moreover, ethoxyethyl acetate has the disadvantage that this solvent, because of the regulations which apply, cannot be used in the USA, for example. These acetates mentioned in DE-A 41 10 520 are therefore likewise not used in practice. Finally, N-methylpyrrolidone (NMP) has the disadvantage that it does not evaporate from the coating film, especially at low temperatures. In addition, the resins prepared in NMP have higher viscosities in comparison with the resins prepared in EEP. The color number of the resins prepared in NMP is, moreover, higher.

The object of the present invention is therefore to provide a process for the preparation of polyurethane resins which permits the cost-effective preparation of polyurethane dispersions and does not involve a stripping procedure. This process should also enable the preparation of polyurethane resin solutions having a high solids content. Furthermore, the polyurethane dispersions prepared by this process, when employed in aqueous coating compositions, should lead to coatings whose mechanical properties conform as closely as possible to the properties of coatings obtained using polyurethane dispersions which have been prepared conventionally.

This object is surprisingly achieved by a process of the type mentioned at the outset, which is characterized in that the polyurethane resin is prepared in ethoxyethyl propionate (EEP) as solvent.

The present invention also relates to the use of the polyurethane resins and to the use of ethoxyethyl propionate as solvent for the preparation of polyurethane resins. In addition, the invention also relates to coating compositions containing these polyurethane resins, to processes for the production of these coating compositions and to methods of coating substrates using these coating compositions, and to substrates coated with these coating compositions.

It is surprising and was not foreseeable that the use, specifically, of ethoxyethyl propionate as solvent for the preparation of polyurethane dispersions in processes known per se would enable the cost-effective preparation of polyurethane dispersions in a process not involving a stripping procedure. Ethoxyethyl propionate is commercially available and obtainable directly in relatively large quantities. A further advantage is that, when ethoxyethyl propionate is used as solvent, because of its good viscosity-regulating properties and its good stability at elevated temperatures, it is also possible to prepare polyurethane resin solutions with high solids contents. The polyurethane resin solutions prepared by the process according to the invention are stable on storage over a long period of at least approximately 12 months. In addition, the use of ethoxyethyl propionate as solvent in the known processes for the preparation of polyurethane dispersions has the advantage that the other process parameters do not require significant alteration. Finally, coatings produced using the polyurethane dispersions prepared in accordance with the invention have good mechanical properties, which are comparable with the properties of coatings obtained using polyurethane dispersions which are prepared conventionally.

The process according to the invention is explained in more detail below.

It is essential to the invention that, in the processes known per se for the preparation of polyurethane dispersions, ethoxyethyl propionate is used as solvent instead of the solvents conventionally employed. Ethoxyethyl propionate (also called ethyl 3-ethoxypropionate [sic]) is outstandingly suitable in this context as a replacement for these known solvents which have hitherto been customary. Ethoxyethyl propionate is unreactive with respect to the starting materials employed in the preparation of the polyurethane resins, and the resulting polyurethane resin solutions are stable on storage over a long period (at least 12 months). In addition, ethoxyethyl propionate is commercially available and is obtainable directly in relatively large quantities. When ethoxyethyl propionate is used as solvent instead of the solvents hitherto customary, it is in addition unnecessary substantially to alter the other process parameters. Switching to the process according to the invention can thus be carried out simply and rapidly and in a cost-effective manner.

In some circumstances it may be necessary to operate the process according to the invention at an elevated reaction solids content (i.e. solvent content during the preparation of the polyurethane resin preferably less than 20% by weight, based on the solids content) and/or with an increase in the proportion of modifying agent and/or an increase in the reaction temperature (particularly preferred range from 100 to 130° C.), in order to ensure that the number-average molecular weight of the polyurethane resin obtained corresponds to the number-average molecular weight of the resin prepared in a conventional manner. However, this can readily be determined on the basis of a few routine experiments.

The starting substances which are suitable for the preparation of the polyurethane resin solutions or polyurethane dispersions, for example polyols, isocyanates, chain extenders, reactive components capable of forming salts, and other auxiliaries, are known and are described, for example, in the following publications:

DE-A 26 24 442, DE-A 32 10 051, EP-A 355 433, DE-A 35 45 618, DE-A 38 13 866, DE-A 40 05 961, DE-A 41 10 520 and DE-A 40 13 546. In respect of examples of suitable structural components of the polyurethane resins, reference is therefore made to these publications.

In the process according to the invention for the preparation of the polyurethane resin, it is preferred first to prepare an isocyanate group-containing prepolymer which is then reacted further, preferably by chain lengthening, to prepare the desired polyurethane resin. In this context components (a), (b) and (c) are reacted by the well-known methods of organic chemistry (cf. e.g. Kunststoff-Handbuch, [Plastics Handbook], Volume 7: Polyurethane [Polyurethanes], edited by Dr. Y. Oertel, Karl-Hanser-Verlag, Munich, Vienna 1983), preferably by reacting the components in stages (e.g. formation of a first intermediate from components (a) and (b) which is then reacted with (c) to give a second intermediate). However, it is also possible to react components (a), (b) and (c) simultaneously. Examples of the preparation of the prepolymers are described in DE-A 26 24 442 and DE-A 32 10 051. In addition, however, the polyurethane resins can also be prepared by simultaneously reacting components (a), (b), (c) and (d).

The reaction temperature during the preparation of the prepolymer from components (a), (b) and (c) is usually up to 150° C., preferably between 80 and 150° C. and particularly preferably from 100 to 120° C. Higher reaction temperatures, from 100 to 120° C., lead in this case to a reduction in the reaction time and are also desirable for the preparation of polyurethane resin solutions of high solids content, since this makes the resin solutions easier to handle (reduction in viscosity).

Components (a), (b) and (c) are reacted in ethoxyethyl propionate as solvent. In this context the quantity of ethoxyethyl propionate can be varied within wide limits and should be sufficient to form a prepolymer solution of appropriate viscosity. In general up to 70% by weight, preferably from 5 to 50% by weight and particularly preferably less than 20% by weight of solvent, based on the solids content, are employed. Thus the reaction can be carried out in a very particularly preferred manner, for example, at a solvent content of 10–15% by weight of EEP, based on the solids content. Components (a), (b) and (c) can if desired be reacted in the presence of a catalyst, such as organotin compounds and/or tertiary amines.

For the preparation of the prepolymers, the quantities of components (a), (b) and (c) are selected such that the ratio of equivalents of NCO to OH groups is between 2.0:1.0 and >1.0:1.0, preferably between 1.4:1 and 1.1:1.

The NCO prepolymer contains at least approximately 0.5% by weight of isocyanate groups, preferably at least 1% by weight of NCO, based on the solids. The upper limit is at approximately 15% by weight, preferably 10% by weight and particularly preferably 5% by weight of NCO.

The polyols (component (a)) employed for the preparation of the prepolymer may be of low and/or high molecular weight and may contain anionic groups which are slow to react. To increase the hardness of the polyurethane, low molecular weight polyols can be employed. They have a molecular weight of from 60 to approximately 400 and may contain aliphatic, alicyclic or aromatic groups. In this case quantities of up to 30% by weight of the overall polyol components, preferably from approximately 2 to 20% by weight, are employed.

To obtain an NCO prepolymer of great flexibility, a high proportion of a predominantly linear polyol having a preferred OH number of from 30 to 150 mg of KOH/g should be added. Up to 97% by weight of the entire polyol may comprise saturated and unsaturated polyesters and/or polyethers having a number-average molecular mass Mn of from 400 to 5000. The polyether diols selected should not introduce excessive quantities of ether groups, since otherwise the polymers formed swell in water. Polyester diols are prepared by esterifying organic dicarboxylic acids or their anhydrides with organic diols, or are derived from a hydroxycarboxylic acid or from a lactone. To prepare branched polyester polyols, it is possible to a minor extent to employ polyols of polycarboxylic acids having a higher functionality. Linear polyester diols are preferably employed.

Examples which can be mentioned of polyether polyols are polyoxyalkylene polyols, especially polyoxypropylene glycols having a molecular weight of from 300 to 3000 (number average).

As component (a) it is also possible to employ polyester polyols whose acid component consists at least partly of dimeric fatty acids. Such systems are described in, for example, U.S. Pat. No. 4,423,179. Apart from the diols listed, compounds containing amino groups are also suitable as component (a) for preparing the prepolymer, but preferably the di- and polyols listed are employed.

Typical multifunctional isocyanates (component (b)) which are used are aliphatic, cycloaliphatic and/or aromatic polyisocyanates having at least 2 isocyanate groups per molecule. The isomeric [sic] or isomeric mixtures of organic diisocyanates are preferred. Because of their good resistance to ultraviolet light, (cyclo)aliphatic diisocyanates result in products with little tendency to yellowing. The polyisocyanate component used to form the prepolymer may also contain a proportion of more highly functional polyisocyanates, provided that this does not cause any gel formation. Triisocyanates which have proven suitable are products formed by trimerization or oligomerization of diisocyanates or by reaction of diisocyanates with polyfunctional compounds containing OH or NH groups. The average functionality can be lowered if desired by adding monoisocyanates.

For the preparation of polyurethane resin solutions of high solids content, the diisocyanates employed are in particular those of the general formula (I)

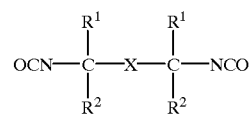

(I)

in which X is a divalent, aromatic hydrocarbon radical, preferably an optionally halogen-, methyl- or methoxy-substituted naphthalene, diphenylene, 1,2-, 1,3- or 1,4-phenylene radical, particularly preferably a 1,3-phenylene radical, and $R_1$ [sic] and $R_2$ [sic] are an alkyl radical having 1 to 4 carbon atoms, particularly preferably a methyl radical.

Diisocyanates of the formula (I) are known (they are described in, for example, EP-A 101 832, U.S. Pat. No. 3,290,350, U.S. Pat. No. 4,130,577 and U.S. Pat. No. 4,439,616) and some are commercially available (for example, 1,3-bis(2-isocyanatoprop-2-yl)benzene is sold by the American Cynamid [sic] Company under the tradename TMXDI (META)®).

In addition to the diisocyanates of the formula (I) or instead of them, it is also possible to employ other aliphatic and/or cycloaliphatic and/or aromatic polyisocyanates. Examples of polyisocyanates which can be employed in addition are 1,3- and 1,4-phenylene diisocyanate, 2,4- and 2,6-tolylene diisocyanate, xylylene diisocyanate, 4,4'-bisphenylene diisocyanate, 1,4- and 1,5-naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

Polyurethanes are generally incompatible with water unless specific components have been incorporated and/or special preparation steps carried out during their synthesis. For instance, the preparation of the polyurethane resins can be carried out using compounds which contain two H-active groups which react with isocyanate groups, and contain at least one group which ensures dispersibility in water (carrier groups). Suitable carrier groups are nonionic groups (e.g. polyethers), anionic groups, mixtures of these two groups, or cationic groups.

Thus the acid number incorporated into the polyurethane resin may be of such an extent that the neutralized product gives a stable dispersion in water. Compounds used for this purpose are those containing two H-active groups which react with isocyanate groups, and at least one group capable of forming anions. Suitable groups which react with isocyanate groups are, in particular, hydroxyl groups and primary and/or secondary amino groups. Groups capable of forming anions are carboxyl, sulfo and/or phosphonic acid groups. It is preferred to use carboxylic acid or carboxylate groups. Their propensity to react should be so low that the isocyanate groups of the diisocyanate react preferentially with the other groups of the molecule which are reactive toward isocyanate groups. Alkanoic acids having two substituents on the a carbon atom are employed for this purpose. The substituent may be a hydroxyl group, an alkyl group or an alkylol group. These polyols have at least one, generally from 1 to 3 carboxyl groups per molecule. They have from 2 to about 25, preferably from 3 to 10 carbon atoms. The carboxyl group-containing polyol may make up from 3 to 100% by weight, preferably from 5 to 50% by weight, of the overall polyol component in the NCO prepolymer.

The quantity of ionizable carboxyl groups available in salt form by neutralization of the carboxyl groups is in general at least 0.4% by weight, preferably at least 0.7% by weight, based on the solids. The upper limit is about 6% by weight. The quantity of dihydroxy alkanoic acids in the unneutralized prepolymer gives an acid number of at least 5, preferably at least 10. In the case of very low acid numbers, further measures are generally necessary in order to achieve dispersibility in water.

The upper limit for the acid number is at 70, preferably at 40, mg of KOH/g, based on the solids. The acid number is preferably in the range from 20 to 30 mg of KOH/g.

Examples of a suitable compound containing at least 2 groups which react with isocyanate groups and at least one group capable of forming anions are dihydroxypropionic acid, dimethylolpropionic acid, dihydroxysuccinic acid or dihydroxybenzoic acid. Also suitable are the polyhydroxy acids accessible by oxidation of monosaccharin, for example glycolic acid, saccharic acid, mucic acid, glycuronic acid and the like.

Examples of compounds containing amino groups are α,δ-diaminovaleric acid, 3,4-diaminobenzoic acid, 2,4-diaminotoluene-5-sulfonic acid, 4,4'-diaminodiphenyl ether-sulphonic acid and the like.

Examples of tertiary amines which are suitable for neutralizing the anionic groups are trimethylamine, triethylamine, dimethylaniline, diethylaniline, triphenylamine, dimethylethanolamine and the like. If the neutralization takes place in the organic phase, it is preferred to employ triethylamine, with dimethylethanolamine being preferred in the case of neutralization in the aqueous phase. As compounds which contain two groups which are reactive toward isocyanate groups, but which are free from groups capable of forming anions, it is for example possible to employ low molecular weight diols or diamines containing primary or secondary amino groups.

In a second stage, the isocyanate groups of the prepolymer which are still present are reacted with a modifying agent. This reaction leads, in particular, to a further linking and to an increase in the molecular weight. The quantity of this modifying agent is determined by its functionality and the NCO content of the prepolymer. The ratio of equivalents of the active hydrogen atoms in the modifying agent to the NCO groups in the prepolymer should generally be lower than 4:1 and should preferably be in the range between 3:1 and 2:1.

The modifying agents employed for the reaction with the prepolymer are preferably diols and particularly preferably tri- and/or polyols.

However, it is also possible to employ other compounds containing active hydrogen atoms as modifying agents, for example polyamines, albeit only provided that the reaction of the prepolymer with the modifying agent can be carried out in an organic solvent (controllably) and that this reaction is not accompanied by any unwanted reactions, for example the gelation at the point of dropwise addition of the amine, as is often observed when using polyamines.

Examples of polyols containing at least 3 hydroxyl groups are trimethylol propane, glycerol, diglycerol, erythritol, mesoerythritol, arabitol, adonitol, etc. Trimethylolpropane is preferably employed. The reaction of the prepolymer with the tri- and/or polyol is preferably controlled by the stoichiometry of the compounds employed such that chain lengthening occurs.

The polyurethane resins prepared by means of the process according to the invention conventionally have a number-average molecular weight of from 1000 to 30,000, preferably from 1500 to 20,000 (determined in each case by gel permeation chromatography with polystyrene as standard), and an acid number of from 5 to 70 mg of KOH/g, preferably from 10 to 30 mg of KOH/g.

The polyurethane resins prepared by the process according to the invention and dissolved in ethoxyethyl propionate are usually diluted further with other solvents, so that the polyurethane resin solutions obtained preferably have a solids content of up to 70% by weight, particularly preferably a solids content of from 50 to 60% by weight. If, however, relatively large quantities of ethoxyethyl propionate are employed during the actual preparation of the polyurethane resins, then dilution with other organic solvents can also be dispensed with.

Examples of solvents which are suitable for diluting the polyurethane resin solution are butoxypropanol, methoxybutanol, propylene glycol monopropyl ether, propylene glycol monoisopropyl ether, methyldiglycol and propylene glycol mono-tert-butyl ether. The selection of these solvents depends on the desired properties of the coating compositions.

The polyurethane resin solutions prepared by the process according to the invention, prepared in ethoxyethyl propionate and, if desired, diluted further can be employed directly for producing the base colors of a mixing system. In this case the further components of the base colors, for example pigments, conventional auxiliaries and additives and, if desired, other additional binders, and the like, are incorporated into the resulting polyurethane resin solutions—as described in DE-A 41 10 520 —by methods which are known to those skilled in the art, by mixing and, if desired, dispersion.

For the production of water-dilutable coating compositions using the mixing system, the water-free base colors required for the desired color, and at least one water-containing, pigment-free component, are then mixed shortly prior to the application of the coating composition.

The polyurethane resin solutions prepared by the process according to the invention and containing ethoxyethyl propionate are also suitable for the production of aqueous coating compositions. In this case the polyurethane resin solution prepared by the process according to the invention and containing ethoxyethyl propionate is transferred to an aqueous phase, which involves the solution being dispersed in water by methods which are well known to those skilled in the art. In contrast to the polyurethane resin solutions prepared by conventional processes, it is not necessary to distill off the ethoxyethyl propionate used as solvent. Instead, the ethoxyethyl propionate can remain in the coating composition. It may if desired be advantageous also to add other cosolvents to the aqueous coating composition obtained. Butoxy propanol is particularly suitable for this purpose since, with butoxy propanol as cosolvent, excellent application results and outstanding optical and mechanical properties of the resulting coating are obtained. In addition—depending on the intended use and profile of requirements of the coating compositions—other solvents are also suitable as cosolvents, for example 3-methoxy butanol, propylene glycol monopropyl ether, propylene glycol mono-tert-butyl ether, propylene glycol monoisopropyl ether and butylglycol.

For the production of aqueous coating compositions, however, it is also possible first to dilute the polyurethane resins prepared by the process according to the invention and dissolved in ethoxyethyl propionate, further with the abovementioned cosolvents and then to disperse these dilute polyurethane resin solutions in water by methods well known to those skilled in the art. In this way, depending on the cosolvents chosen, dispersion in water may in some cases be possible with greater ease.

The production of the aqueous coating compositions from the polyurethane dispersions prepared in accordance with the invention, by incorporating the remaining components such as, for example, pigments, auxiliaries and additives, other binders and the like, is carried out by well-known conventional methods (mixing and, if desired, dispersion) and therefore requires no more detailed explanation.

The polyurethane resins prepared by the process according to the invention are particularly suitable for use in coating compositions used to produce multilayer coatings.

The present invention therefore also relates to a process for the production of a multilayer protective and/or decorative coating on a substrate surface, in which 1.) a basecoat composition is applied,
2.) a polymer film is formed on the surface from the composition applied in stage (1),
3.) a transparent topcoat is applied to the resulting basecoat, and
4.) the topcoat is cured together with the basecoat.

The process is characterized in that the basecoat composition applied in stage (1) and/or the topcoat applied in stage (3) contains a polyurethane resin prepared by the process according to the invention.

The aqueous polyurethane dispersions prepared by the process according to the invention are particularly suitable, furthermore, for the production of aqueous coating compositions for the coating of motor vehicle bodies (production line coating) and/or plastic parts. However, they can also be applied to other substrates, for example glass, metals, wood and the like. In addition, they are preferably employed for the production of water-dilutable refinish coatings, especially in the area of automotive refinishing. They are particularly well suited to the production of is aqueous basecoats for the refinishing of motor vehicles. In addition to this, however, the polyurethane dispersions prepared in accordance with the invention also find numerous other areas of application, from adhesives and leather finishing compositions to coating compositions for a very wide variety of application areas, for example fillers or coating compositions for industrial products, large machines etc.

The invention is now illustrated in more detail on the basis of examples. In these examples all indications of parts and percentages are by weight, unless expressly stated otherwise.

POLYESTER A

In an apparatus conventional for polyester synthesis, 891.2 parts of Pripol 1013 (commercial dimeric fatty acid with a monomer content of not more than 0.1%, a trimer content of not more than 2%, an acid number of from 195 to 198 mg of KOH/g and a hydrolysis number of 198–202 mg of KOH/g), 292.8 parts of hexane-1,6-diol, 360.3 parts of isophthalic acid and 250.7 parts of neopentyl glycol together with xylene as entraining agent are reacted to an acid number <5.0. The xylene is distilled off and the polyester is run up to an acid number of 3–4. The batch is cooled to 110° C. and dissolved in ethylethoxy propionate to a solids content of 70.2%. The polyester A has an Mn value of 2333 and an $M_w$ value of 4912.

POLYESTER B

In an apparatus conventional for polyester synthesis, 371.2 parts of Pripol 1013, 107.7 parts of cyclohexanedimethanol, 723.3 parts of neopentylglycol hydroxypivalate, 17.2 parts of ethylbutylpropanediol, 392.6 parts of neopentylglycol, 0.8 part of n-butyltin oxide hydrate and 1018.7 parts of isophthalic acid together with cyclohexane as entraining agent are reacted to an acid number <5.0. The cyclohexane is distilled of f and the polyester is run up to an acid number of <1.5. The batch is cooled to approximately 110° C. and dissolved with ethylethoxy propionate to 79.5%. The polyester B has an $M_n$ value of 2352 and an $M_w$ value of 4578.

POLYESTER C

This polyester corresponds to polyester B, but has been dissolved to an SC of 79.5% in N-methylpyrrolidone.

EXAMPLES 1a, 1b, 1c and 1d

Preparation of the Polyurethane Resin Solutions 1a–1d

In a 5 l reaction vessel with stirrer and reflux condenser, a mixture of 1462.6 parts of the polyester diol A, 14.7 parts of neopentylglycol, 89.4 parts of dimethylolpropionic acid and 450.9 parts of tetra-methylxylene diisocyanate are heated at a reaction temperature of a) 95° C., b) 105° C., c) 115° C. and, respectively, d) 125° C. until a constant NCO value of the mixture is reached. Subsequently, per mole of diisocyanate prepolymer, 1.78 times the quantity of moles of trimethylolpropane are added and the mixture is allowed to react until the isocyanate content is virtually zero. The mixture is dissolved with 924 parts of butoxypropanol and, in one portion at a temperature of 100° C., 55.7 parts of N,N-dimethylethanolamine are added. The mixture was finally adjusted to a solids content of 60% with butoxypropanol. The GPCs were measured using tetrahydrofuran as mobile phase at a flow rate of 0.9 ml/min and an average pressure of 24 bar on a separating column from Waters (Kombi) and polystyrene as standard.

| Example | 1a | 1b | 1c | 1d |
|---|---|---|---|---|
| Reaction temperature ° C. | 95 | 105 | 115 | 125 |
| $M_n$ | 7,010 | 6,784 | 6,065 | 5,861 |
| $M_w$ | 33,612 | 33,082 | 27,655 | 28,657 |

EXAMPLE 2

Preparation of the Polyurethane Resin Solution 2

In a 5 l reaction vessel with stirrer and reflux condenser, a mixture of 1492.5 parts of the polyester diol B, 7.4 parts of neopentylglycol, 106.7 parts of dimethylolpropionic acid and 447.4 [lacuna] of tetramethylxylene diisocyanate is heated to a reaction temperature of 115° C. until a constant NCO value of the mixture is reached. Subsequently, per mole of diisocyanate, 1.88 times the quantity of moles of trimethylol propane are added and the mixture is allowed to react until the isocyanate content is virtually zero. The mixture is dissolved with 500 parts of butoxypropanol and, in one portion at a temperature of 100° C., 53.2 parts of dimethylethanolamine are added. The mixture was finally adjusted to a solids content of 60% with butoxypropanol ($M_n$ 5426, $M_w$ 18532).

A solution of 10 parts of this resin with 3 parts of N-methylpyrrolidone had a viscosity of 19 dpas (ICI plate/cone viscometer). The Gardner color number is 4–5.

Comparison Example 1

Preparation of the Polyurethane Resin Solution C1

In a 5 l reaction vessel with stirrer and reflux condenser, a mixture of 995 parts of the polyester diol C, 4.9 parts of neopentylglycol, 71.2 parts of dimethylolpropionic acid and 298.3 parts of tetramethylxylene diisocyanate is heated to a reaction temperature of 115° C. until a constant NCO value of the mixture is reached. Subsequently, per mole of diisocyanate, 1.88 times the quantity of moles of trimethylolpropane are added and the mixture is allowed to react until the isocyanate content is virtually zero. The mixture is dissolved with 500 parts of butoxypropanol and, in one portion at a temperature of 100° C., 35.5 parts of dimethylethanolamine are added. The mixture was finally adjusted to a solids content of 60% with butoxypropanol ($M_w$ [sic] 5589, $M_w$ 19062).

A solution of 10 parts of this resin with 3 parts of N-methylpyrrolidone had a viscosity of 32 dPas (ICI plate/cone viscometer). The Gardner color number is 7–8.

EXAMPLE 3

Preparation of a Polyurethane Resin Dispersion

In a 5 l reaction vessel with stirrer and reflux condenser, a mixture of 895.5 parts of the polyester diol B, 4.4 parts of neopentylglycol, 64.0 parts of dimethylolpropionic acid and 268.5 parts of tetramethylxylene diisocyanate is heated at a reaction temperature of 115° C. until a constant NCO value of the mixture is reached. Subsequently, per mole of diisocyanate, 1.88 times the quantity of moles of trimethylolpropane are added and the mixture is allowed to react until the isocyanate content is virtually zero. Following the addition of 38.2 parts of N,N-dimethylethanolamine at 110° C., the mixture is stirred for half an hour. Deionized water is then added at 80° C. and the mixture is adjusted to a solids content of 35.8%. The pH of the dispersion was 7.4. The dispersion is stable at room temperature over a relatively long period.

Preparation of the Pigment-free Mixture B1

The following are added with stirring to 33.2 parts of the polyurethane resin dispersion of Example 3: 43 parts of a preswollen aqueous paste containing 3% by weight of an inorganic sodium magnesium phyllosilicate thickening agent and 3% by weight of polypropylene glycol having a number-average molecular weight of 900, the percentages being based on the total weight of the paste, 19.8 parts of deionized water, 0.5 part of a commercially available antifoam and 3.5 parts of a 3.5% strength solution of a commercially available polyurethane thickener in water.

Preparation of a Blue-pigmented Base Color A1

12 parts of Paliogen Blue, 50 parts of the 60% strength neutralized polyurethane resin solution 1d, 23 parts of butylglycol and 15 parts of isobutanol are mixed with stirring and dispersed using a sand mill.

Preparation of an Aluminum-containing Base Color A2

27 parts of an aluminum bronze chromatized in accordance with DE-A 3 636 183 (aluminum content 65%, average particle diameter 15 μm) are homogeneously dispersed in 6.6 parts of butylglycol, 23.6 parts of the 60% strength polyurethane resin solution 1d and 13.6 parts of isobutanol by stirring for 15 minutes, and are then run with stirring into 29.2 parts of the 60% strength neutralized polyurethane resin solution 1d. This mixture is stirred for a further 30 minutes using a high-speed stirrer at 100 rpm.

Preparation of Coating Compositions I to V

Polyurethane resin solution 1d and the polyurethane resin dispersion of Example 3 are used to prepare aqueous coating compositions by stirring the base color A1 or A2, respectively, directly after its preparation into the mixture B1.

The viscosity is then adjusted to a flow time of about 25 sec. from a DIN-4 cup (20° C.).

TABLE

| | Composition of the aqueous basecoat compositions I to V, in parts | | | | |
|---|---|---|---|---|---|
| Example | I | II | III | IV | V |
| A2 | 19.00 | 14.25 | 12.7 | 9.5 | 6.3 |
| A1 | — | 4.25 | 5.7 | 8.5 | 11.3 |
| B1 | 81.00 | 81.5 | 81.6 | 82.00 | 82.4 |
| | 100.00 | 100.00 | 100.00 | 100.00 | 100.00 |

Directly after the preparation of the aqueous basecoat compositions they are sprayed by well-known methods onto phosphatized steel panels (Bonder 132) coated with a commercially available electrodeposition coating and a conventional (i.e. solvent-containing) or water-containing filler, and after a flash-off time of 30 minutes at room temperature (at a relative atmospheric humidity of 50% and a room temperature of 20° C.) are coated over with a commercially available, conventional 2-component clearcoat based on a hydroxyl group-containing acrylate copolymer and on an isocyanate crosslinking agent, and are dried at 60° C. for 30 minutes. The dry film thickness of the basecoat composition is ≈15 μm, that of the clearcoat ≈50 μm.

The coatings obtained correspond to those described in DE-A 41 10 520 in respect of the metallic effect, the adhesion and the freedom from clouding.

What is claimed is:
1. Process for the preparation of polyurethane resins, comprising reacting in ethoxyethyl propionate as solvent,
   a) at least one compound having 2 functional groups selected from the group consisting of hydroxyl groups, amino groups, and mixtures thereof,
   b) at least one compound selected from the group consisting of diisocyanates, polyisocyanates, and mixtures thereof,
   c) at least one compound containing 2 groups which are reactive toward isocyanate groups, these compounds containing, at least in part, at least one group capable of forming anions, wherein components a), b) and c) are reacted to form an intermediate which has terminal isocyante groups and subsequently reacting at least some of the isocyanate groups with
   d) at least one compound having at least 3 hydroxyl and/or amino groups.
2. Process according to claim 1, characterized in that the resulting reaction product is transferred to an aqueous phase.
3. Process according to claim 2, characterized in that butoxypropanol is added as cosolvent.
4. Process according to claim 1 or 2, characterized in that the ethoxyethyl propionate is employed in a quantity of from 50 to 5% by weight based on the solids content of the polyurethane resin solution.
5. Process according to claim 1, characterized in that components (a), (b) (c) and (d) are reacted at a reaction temperature of from 80 to 150° C.
6. Coating composition based on polyurethane resins, characterized in that it contains as binder a polyurethane resin prepared in accordance with claim 1.
7. Process for the production of coating compositions comprising mixing a polyurethane resin prepared in accor- dance with claim 1 with additional components selected from the group consisting of pigments, additives, additional binders and mixtures thereof.

8. Process for the production of a multilayer protective and/or decorative coating on a substrate surface, comprising 1.) applying a basecoat composition to a substrate, 2.) forming a polymer film on the substrate surface from the composition applied in stage (1), 3.) applying a transparent topcoat to the resulting basecoat, and 4.) curing the topcoat together with the basecoat, characterized in that the basecoat composition applied in stage (1) and/or the topcoat applied in stage (3) contains a polyurethane resin which has been prepared in accordance with claim 1.

9. Substrate coated with a single-layer or multilayer protective and/or decorative coating, characterized in that at least one of the layers of the coating contains a polyurethane resin prepared according to claim 1.

10. Water-dilutable coating composition comprising polyurethane resins prepared by the process according to one claim 1.

11. Automotive water-dilutable coating composition comprising polyurethane resins prepared by the process according to claim 1 as binder.

12. Process for the preparation of polyurethanes and aqueous polyurethane dispersions comprising forming a polyurethane In the presence of ethoxyethyl propionate as a viscosity regulating, nonreactive component by reacting a) at least one compound having 2 functional groups selected from the group consisting of hydroxyl groups, amino groups, and mixtures thereof, b) at least one compound selected from the group consisting of dilsocyanates, polyisocyanates, and mixtures thereof, c) at least one compound containing 2 groups which are reactive toward Isocyanate groups, these compounds containing, at least in part, at least one group capable of forming anions, wherein components a), b), and c) are reacted to form an intermediate that has terminal isocyanate groups and subsequently reacting at least some of the Isocyanate groups with d) at least one compound having at least 3 hydroxyl and/or amino groups.

13. Process according to claim 2, characterized in that the resulting reaction product is transferred to an aqueous phase and further solvents are added as cosolvents.

14. Process according to claim 1 or 2, characterized in that the ethoxyethyl propionate is employed in a quantity of less than 20% by weight, based on the solids content of the polyurethane resin solution.

15. Process according to claim 1, characterized in that components (a), (b), (c) and (d) are reacted at a reaction temperature of from 100° C. to 120° C.

16. Automotive refinish water-dilutable coating composition comprising polyurethane resins prepared by the process according to claim 1 as binder.

* * * * *